US009135413B2

(12) United States Patent
Canterbury et al.

(10) Patent No.: US 9,135,413 B2
(45) Date of Patent: Sep. 15, 2015

(54) DATA PROTECTION IN A WAGERING GAME MACHINE

(75) Inventors: Stephen A. Canterbury, Antioch, IL (US); Vernon W. Hamlin, Lisle, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 1073 days.

(21) Appl. No.: 12/445,896

(22) PCT Filed: Nov. 2, 2007

(86) PCT No.: PCT/US2007/023167
§ 371 (c)(1),
(2), (4) Date: Apr. 16, 2009

(87) PCT Pub. No.: WO2008/057433
PCT Pub. Date: May 15, 2008

(65) Prior Publication Data
US 2010/0311500 A1    Dec. 9, 2010

Related U.S. Application Data

(60) Provisional application No. 60/864,063, filed on Nov. 2, 2006.

(51) Int. Cl.
G06Q 99/00    (2006.01)
G06F 21/12    (2013.01)
A63F 9/24     (2006.01)
G06Q 50/00    (2012.01)

(52) U.S. Cl.
CPC .............. *G06F 21/121* (2013.01); *A63F 9/24* (2013.01); *G06F 2221/0704* (2013.01); *G06F 2221/2109* (2013.01); *G06Q 50/00* (2013.01)

(58) Field of Classification Search
CPC ................................. G06Q 50/00; A63F 9/24
USPC ......................................... 705/51, 56; 463/29
See application file for complete search history.

(56) References Cited

U.S. PATENT DOCUMENTS

| 7,490,245 B2 * | 2/2009 | Waltermann et al. ......... 713/189 |
| 7,749,076 B2 * | 7/2010 | Morrow ......................... 463/25 |
| 8,041,957 B2 * | 10/2011 | Michaelis et al. ............ 713/187 |
| 2004/0048660 A1 | 3/2004 | Gentles et al. |
| 2005/0005098 A1 * | 1/2005 | Michaelis et al. ............ 713/156 |
| 2006/0020821 A1 * | 1/2006 | Waltermann et al. ......... 713/189 |
| 2006/0068895 A1 | 3/2006 | Nguyen et al. |
| 2006/0079333 A1 * | 4/2006 | Morrow et al. ................. 463/43 |
| 2006/0093142 A1 | 5/2006 | Schneier et al. |

OTHER PUBLICATIONS

"International Application Serial No. PCT/US2007/023167, Search Report mailed Jun. 5, 2008", 4 pgs.
"International Application Serial No. PCT/US2007/023167, Written Opinion mailed Jun. 5, 2008", 6 pgs.

* cited by examiner

*Primary Examiner* — James D Nigh
(74) *Attorney, Agent, or Firm* — Nixon Peabody LLP

(57) ABSTRACT

In some embodiments, a method includes retrieving a value associated with a nonvolatile machine-readable medium from the nonvolatile machine-readable medium of a wagering game machine. The method also includes retrieving an authentication value from the nonvolatile machine-readable medium. The authentication value is derived from the value. The method includes enabling execution of a wagering game application stored in the nonvolatile machine-readable medium, in response to determining that the authentication value authenticates the wagering game application.

9 Claims, 8 Drawing Sheets

DATA PROTECTION IN A WAGERING GAME MACHINE

RELATED APPLICATIONS

This patent application is a U.S. National Stage Filing under 35 U.S.C. 371 from International Patent Application Serial No. PCT/US2007/023167, filed Nov. 2, 2007, and published on May 15, 2008, as WO 2008/057433 A2 and republished as WO 2008/057433 A3, which claims the priority benefit of U.S. Provisional Patent Application Ser. No. 60/864,063 filed Nov. 2, 2006 and entitled "DATA PROTECTION IN A WAGERING GAME MACHINE", the contents of which are incorporated herein by reference in their entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2006, 2007 WMS Gaming, Inc.

FIELD

Embodiments of the inventive subject matter relate generally to wagering game machines, and more particularly, to data protection in wagering game machines.

BACKGROUND

Wagering game machine makers continually provide new and entertaining games. One way of increasing entertainment value associated with casino-style wagering games (e.g., video slots, video poker, video black jack, and the like) includes offering a variety of base games and bonus events. However, despite the variety of base games and bonus events, players often lose interest in repetitive wagering gaming content. In order to maintain player interest, wagering, game machine makers frequently update wagering game content with new game themes, game settings, bonus events, game software, and other electronic data.

BRIEF DESCRIPTION OF THE FIGURES

Embodiments of the invention are illustrated by way of example and not limitation in the Figures of the accompanying drawings in which.

DESCRIPTION OF THE EMBODIMENTS

Systems, apparatus and methods for protection of data in a wagering game machine are described herein. This description of the embodiments is divided into four sections. The first section describes protection of data in a wagering game machine using an external authentication device. The second section describes protection of data in a wagering game machine based on a serial number verification of a nonvolatile machine-readable medium therein. The third section describes an example operating environment and system architecture. The fourth section provides some general comments.

Some embodiments provide a license for data stored in a wagering game machine. The license may be for one or more wagering game applications to be played on the wagering game machine. In some embodiments, the wagering game applications are stored on nonvolatile machine-readable media (such as FLASH, magnetic storage media (e.g., hard drives), etc.). If not properly protected, unauthorized copies of a wagering game application (on a single medium) may be distributed and executed on a number of wagering game machines. Some embodiments may preclude or make difficult the unauthorized distribution and execution of wagering game applications across multiple wagering game machines.

Protection of Data in a Wagering Game Machine Using an External Authentication Device In some embodiments, an external authentication device (such as a dongle, a hardware key, a hardware token, a security device, etc.) is used to protect the data in wagering game machine. The external authentication device may provide a license to execute a wagering game application on the wagering game machine. As further described below, such authentication may be based on any number of cryptographic operations (such as public key cryptography, private key cryptography, digital signatures, hashing, etc.). Some embodiments are described relative to having an operator couple an external authentication device an I/O port of the wagering game machine. However, embodiments are not so limited. For example, particular embodiments may provide such authentication over a network that is coupled to the wagering game machine. For example, a wagering game application may be required to be activated (based on communications with a server) over the network, in accordance with particular embodiments.

Figure 1:
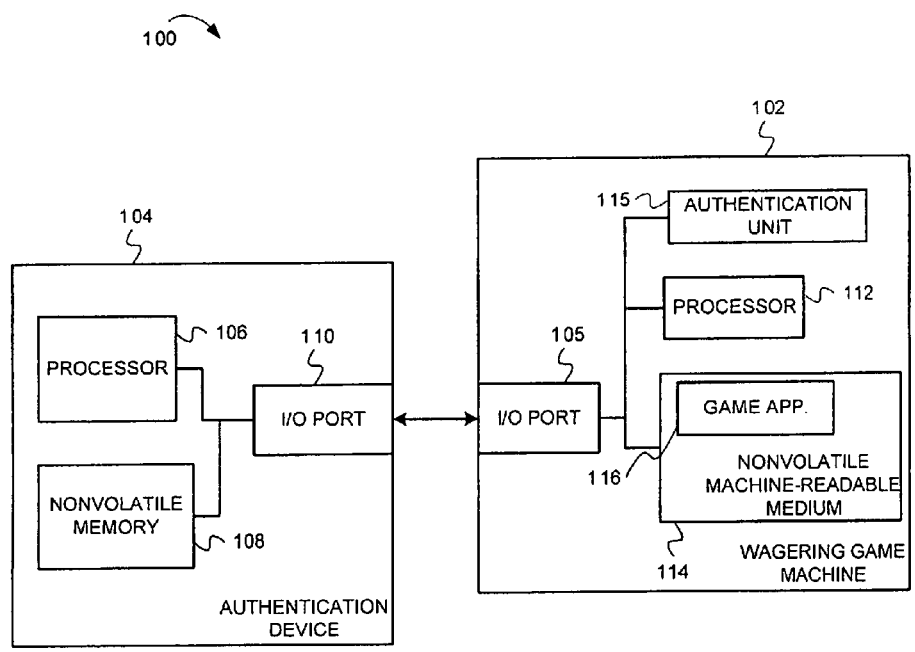
FIG. 1 is a block diagram illustrating parts of a wagering game machine and an external authentication device providing data protection, according to example embodiments of the invention.

FIG. 1 is a block diagram illustrating parts of a wagering game machine and an external authentication device providing data protection, according to example embodiments of the invention. A system 100 includes a wagering game machine 102 that is coupled to an external authentication device 104. The wagering game machine 102 includes an input/output (I/O) port 105, a processor 112, a nonvolatile machine-readable medium 114 and an authentication unit 115, which are coupled together (e.g., through a bus). The nonvolatile machine-readable medium 114 stores a wagering game application 116. The authentication unit 115 may include hardware, firmware, and/or software for performing authentication operations described herein. For example, the authentication unit 115 may be software stored in a machine-readable media that is executed by the processor 112. The wagering gaming machine 102 may include a number of other components (volatile memory, display, I/O components for wagering game interaction with a player, etc.). Example embodiments of such a wagering game machine are described in more detail below.

The external authentication device 104 includes an I/O port 110, a processor 106 and a nonvolatile memory 108, which are coupled together (e.g. through a bus). The external authentication device 104 may include other components therein (such as volatile memory). The external authentication device 104 may be representative of a dongle, hardware key, hardware token, security device, etc.

The I/O port 104 and the I/O port 110 may comprise one or more serial ports (e.g., Universal Serial Bus (USB) or FireWire), parallel ports (e.g., general purpose interface bus (GPIB) or printer port), wired network interfaces, optical interfaces, and/or wireless network interfaces, including interfaces operating according to an Institute of Electrical and Electronics Engineers (IEEE) 802.11x standard.

For more information regarding the FireWire interface, please refer to the IEEE 1394b-2002 Standard, "IEEE Standard for a High Performance Serial Bus—Amendment 2," published in 2002, and recent revisions. For more information regarding IEEE 802.11x (e.g., IEEE 802.11g) standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999," and related amendments/revisions.

In some embodiments, the authentication device 104 provides a license to use data stored in the wagering game machine 102. For example, the authentication device 104 may provide a license to enable execution of the wagering game application 116 stored in the nonvolatile machine-readable medium 114.

Figure 2:
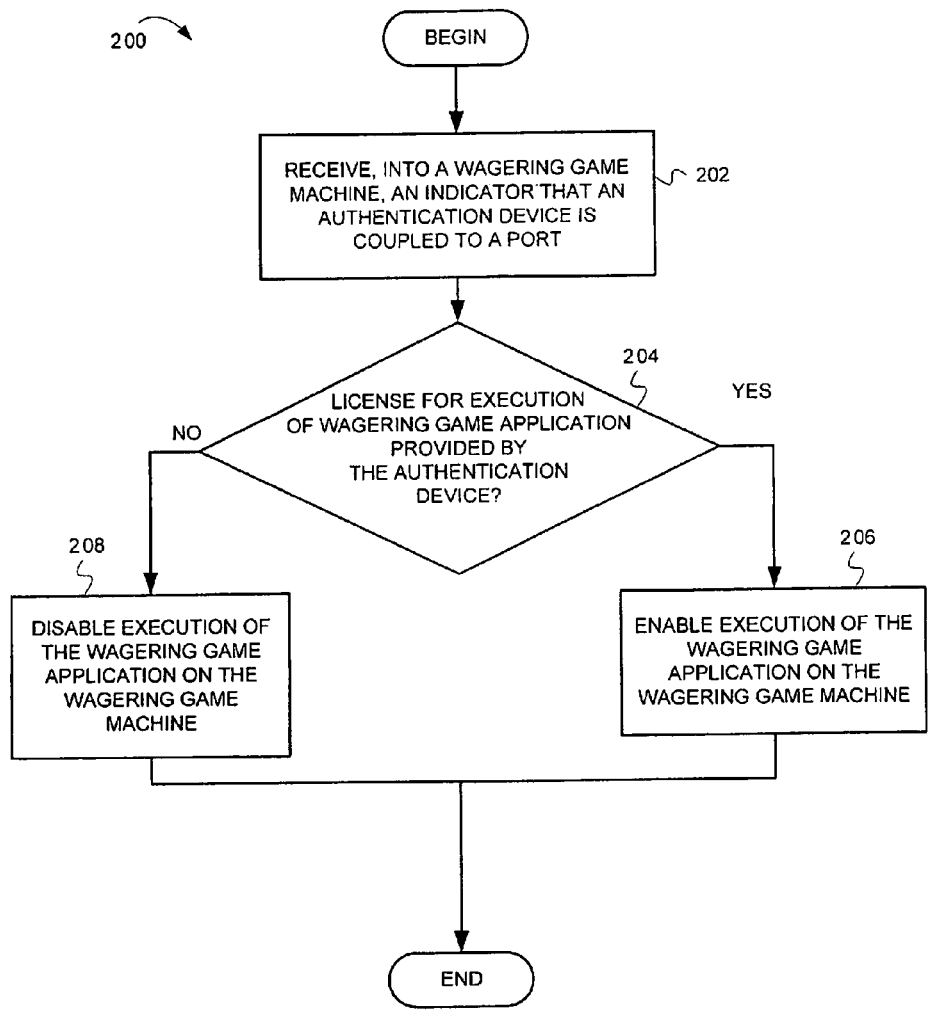
FIG. 2 is a flow diagram for operations for protection of data in a wagering game machine using an external authentication device, according to example embodiments of the invention.

FIG. 2 is a flow diagram for operations for protection of data in a wagering game machine using an external authentication device, according to example embodiments of the invention. In certain embodiments, the operations are performed by instructions residing on machine-readable media (e.g., software), while in other embodiments, the methods are performed by hardware or other logic (e.g., digital logic). FIG. 2 illustrates operations that may be executed by components within the wagering game machine 102 (shown in FIG. 1). The flow diagram 200 is described with reference to FIG. 1. In some embodiments, the operations of the flow diagram 200 are executed as part of a boot-up of the wagering game machine 102. The operations may be executed at the initial execution of the wagering game application 116. The flow diagram 200 commences at block 202.

At block 202, an indicator that an authentication device is coupled to a port of a wagering game machine is received into the wagering game machine. In some embodiments, the authentication unit 115 may receive this indicator through the I/O port 104. For example, the authentication device 104 may transmit an authentication flag after being connected to an external I/O port. The I/O port 104 may forward the indicator to the authentication unit 115. The indicator may identify one to a number of different wagering game applications for which the authentication device 104 may provide a license. The authentication unit 115 may determine which of the identified wagering game applications are stored and/or executable on the wagering game machine 102. The flow continues at block 204.

At block 204, a determination is made of whether the authentication device provides a license for execution of the wagering game application in the nonvolatile memory of the wagering game machine. In some embodiments, the authentication unit 115 may make this determination. This determination may be based on any of a number of authentication operations. For example, the authentication may be based on private-key cryptography, public-key cryptography, digital signatures, hashing, etc. For example, the authentication may be based on Twofish, Serpent, AES (Advanced Encryption Standard), Blowfish, CAST5, RC2, RC4, RC5, various Data Encryption Standard (DES) standards (such as DES, 3×DES, etc.), Message Digest (MD)-5, International Data Encryption Algorithm (IDEA), Diffie-Hellman, Digital Signature Standard (DSS), ElGamal, various elliptic curve techniques, various password-authenticated key agreement techniques, Paillier cryptosystem, RSA encryption algorithm (PKCS), etc.

The authentication device 104 may authenticate using digital signatures. To illustrate, the authentication device 104 may store a digital signature for the wagering game application 116 stored on the wagering game machine 102. The authentication device 104 may transmit the digital signature to the wagering game machine 102. The authentication unit 115 may decrypt the digital signature (generating a message digest). The authentication unit 115 may also hash the wagering game application 116 to generate a message digest. The authentication unit 115 may then compare the two message digests. If equal, the authentication device has provided a license for execution of the wagering game application 116.

The authentication device 104 may also authenticate based on encryption/decryption. For example, the authentication unit 115 on the wagering game machine 102 may transmit a value to the authentication device 104. The authentication device 104 may encrypt the data and return the encrypted data to the wagering game machine 102. The authentication unit 115 may then decrypt the encrypted data. Such operations may be based on public key or private key cryptography. The authentication unit 115 may then verify that the original value. If original value transmitted equals the decrypted value, the authentication device has provided a license for execution of the wagering game application 116.

Returning to the flow diagram 200, in response to a determination that the authentication device (coupled to the wagering game machine) provides authentication of the wagering game application, the flow continues at block 206. Otherwise the flow continues at block 208 (described in more detail below).

At block 206, execution of the wagering game application on the wagering game machine is enabled. With reference to FIG. 1, the authentication unit 115 enables execution. The authentication unit 115 may enable by allowing access to the parts of machine-readable medium storing the wagering game application, allowing access to certain registers used for execution, enabling the loading of the application for execution, etc.

At block 208, execution of the wagering game application on the wagering game machine is disabled. With reference to FIG. 1, the authentication unit 115 disables execution. The authentication unit 115 may disable by preventing access to the parts of machine-readable medium storing the wagering game application, preventing access to certain registers used for execution, disabling the loading of the application for execution, etc. The operations of the flow diagram 200 are complete.

Protection of Data in a Wagering Game Machine Based on Serial Number Verification of a Nonvolatile Machine-Readable Medium Some embodiments use a value (e.g., a serial number) associated with a nonvolatile machine-readable medium in a wagering game machine to protect data (such as a wagering game application) therein. In particular embodiments, an authentication value may be derived from this serial number, using various cryptographic operations. This authentication value may be used to authenticate that the data stored in a machine-readable medium in the wagering game machine. Such embodiments associate the data to the machine. As further described below, such a configuration may preclude or make difficult the unauthorized distribution of data to wagering game machines.

Embodiments are not limited to use of a value associated with a nonvolatile machine-readable medium. Some embodiments may use any type of identifier that associates the data to the wagering game machine (e.g., an identification of a processor, a value stored in a particular register, etc.). Accordingly, if the data (e.g., a wagering game application) is copied to a different wagering game machine, such data will not be authenticated (as further described below). While described such that the value and its associated authentication value are stored within the wagering game machine, embodiments are not so limited. For example, both or either the value and the authentication value may be stored in a remote storage device (which may be accessible over a network).

Figure 3:
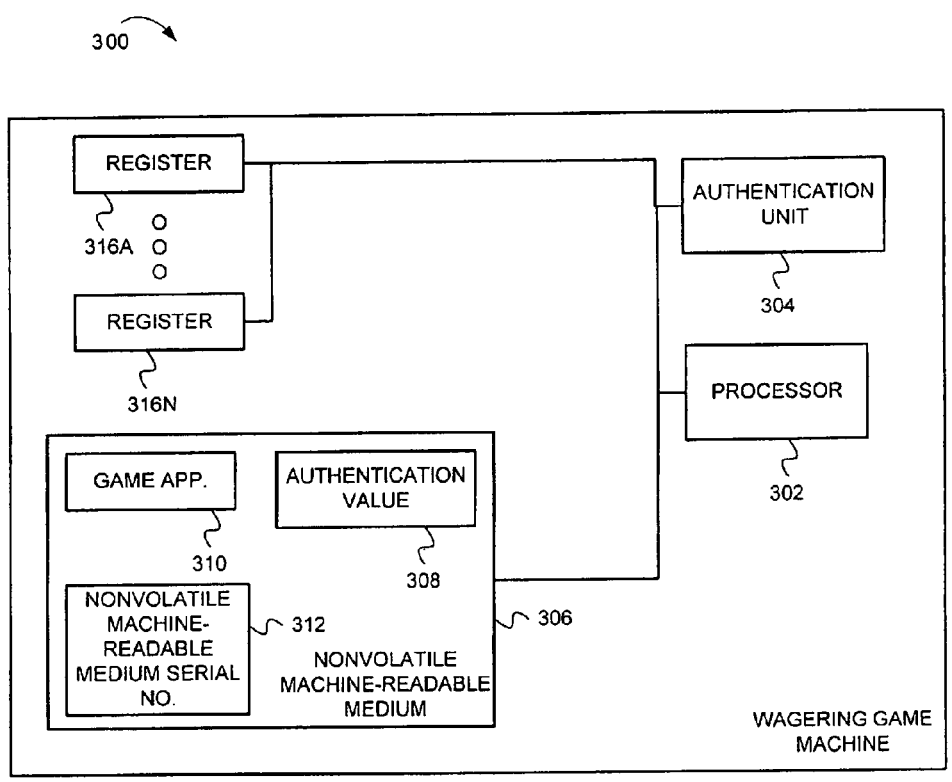
FIG. 3 is a block diagram illustrating parts of a wagering game machine having data protection based on a value associated with a nonvolatile machine-readable medium therein, according to example embodiments of the invention.

FIG. 3 is a block diagram illustrating parts of a wagering game machine having data protection based on a value associated with a nonvolatile machine-readable medium therein, according to example embodiments of the invention. A wagering game machine 300 includes a processor 302, a nonvolatile machine-readable medium 306, a hardware authentication unit 304 and a number of hardware registers 316A-316N, which are coupled together. For example, the processor 302, the nonvolatile machine-readable medium 306, the authentication unit 304 and the number of registers 316A-316N may be coupled together through a bus.

The nonvolatile machine-readable medium 306 stores a wagering game application 310, a nonvolatile machine-readable medium serial number 312 and an authentication value 308. The serial number 312 may be representative of a value that is associated with the nonvolatile machine-readable medium. In some embodiments, the serial number 312 may be unique for at least part of a series of machine-readable media. For example, the serial number 312 may be unique for all machine-readable media across different manufacturers, all machine-readable media for a given manufacturer, for some sub-set of machine-readable media for a same manufacturers or different manufacturers, etc. In some embodiments, the serial number 312 is read-only.

The authentication value 308 is derived from the serial number 312 using various cryptographic operations (such as public key cryptography, private key cryptography, digital signatures, hashing, etc.). In particular embodiments, the authentication value 308 may be generated as part of the manufacturing of the wagering game machine. Alternatively, the authentication value 308 may be transmitted over a network to the wagering game machine. For example, this value may be transmitted during the initial set-up of the wagering game machine.

In some embodiments, the authentication unit 304 may include hardware, firmware, and/or software for performing authentication operations described herein. For example, the authentication unit 304 may be software stored in a machine-readable media that is executed by the processor 302. Alternatively, the authentication unit 304 may be a hardware component that executes independent of the processor 302. In some embodiments, the number of registers 316A-316N may be hardware registers that are only accessed by the authentication unit 304. The wagering gaming machine 300 may include a number of other components (volatile memory, display, I/O components for wagering game interaction with a player, etc.). Example embodiments of such a wagering game machine are described in more detail below.

Figure 4:
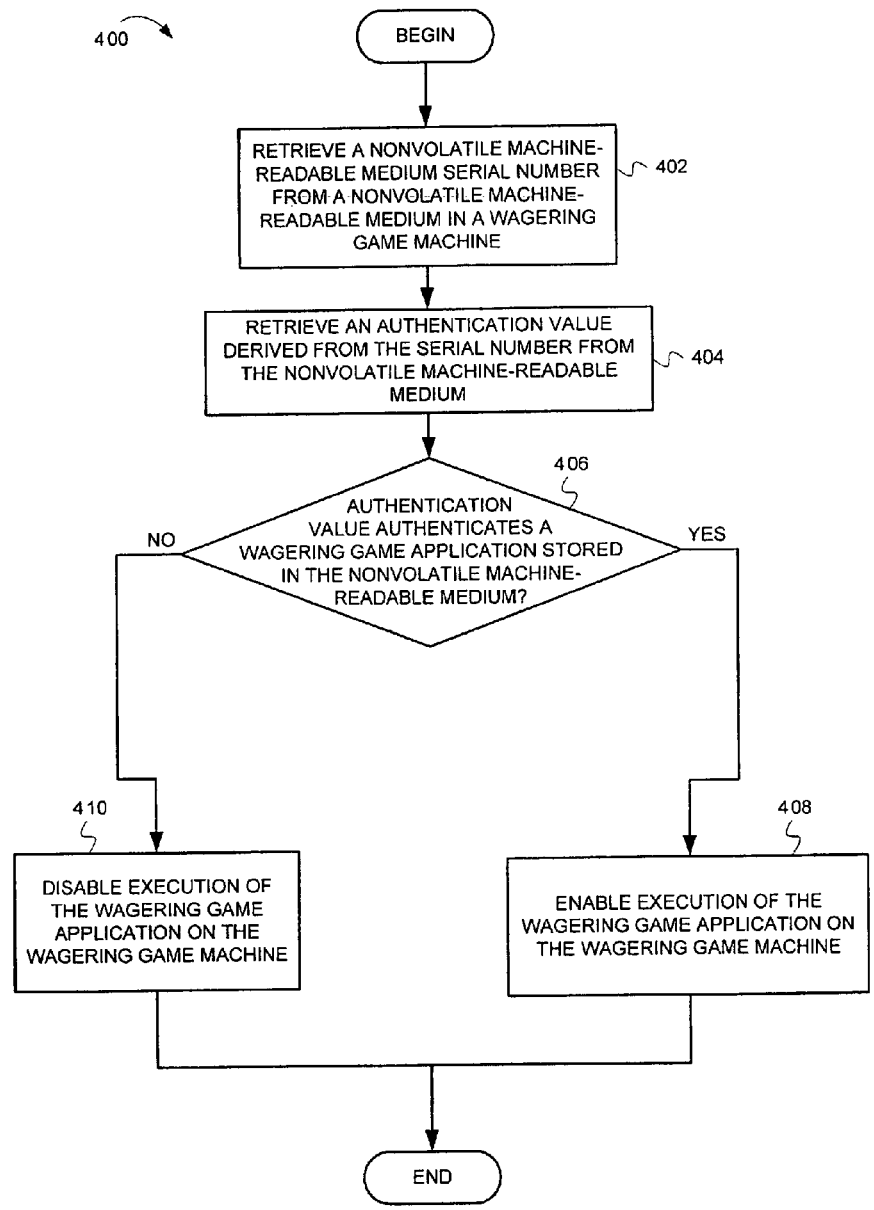
FIG. 4 is a flow diagram for operations for protection of data in a wagering game machine using a serial number of a nonvolatile machine-readable medium, according to example embodiments of the invention.

FIG. 4 is a flow diagram for operations for protection of data in a wagering game machine using a serial number of a nonvolatile machine-readable medium, according to example embodiments of the invention. In certain embodiments, the operations are performed by instructions residing on machine-readable media (e.g., software), while in other embodiments, the methods are performed by hardware or other logic (e.g., digital logic). FIG. 4 illustrates operations that may be executed by components within the wagering game machine 300 (shown in FIG. 3). The flow diagram 400 is described with reference to FIG. 3. In some embodiments, the operations of the flow diagram 400 are executed as part of a boot-up of the wagering game machine 300. The operations may be executed at the initial execution of the wagering game application 310. The flow diagram 400 commences at block 402.

At block 402, an authentication value is retrieved from a nonvolatile machine-readable medium in the wagering game machine. In some embodiments, the authentication unit 304 retrieves the authentication value. The authentication unit 304 may store the authentication value into one of the registers 316. The flow continues at block 406.

At block 406, a determination is made of whether the authentication value authenticates a wagering game application stored in the nonvolatile machine-readable medium. In some embodiments, the authentication unit 304 may make this determination. This determination may be based on any of a number of authentication operations. For example, the authentication may be based on private-key cryptography, public-key cryptography, digital signatures, hashing, etc. For example, the authentication may be based on Twofish, Serpent, AES (Advanced Encryption Standard), Blowfish, CAST5, RC2, RC4, RC5, various Data Encryption Standard (DES) standards (such as DES, 3×DES, etc.), Message Digest (MD)-5, International Data Encryption Algorithm (IDEA), Diffie-Hellman, Digital Signature Standard (DSS), ElGamal, various elliptic curve techniques, various password-authenticated key agreement techniques, Paillier cryptosystem, RSA encryption algorithm (PKCS), etc.

The authentication unit 304 may authenticate using a digital signature. To illustrate, the authentication value 308 is a digital signature. The digital signature may be derived from the serial number 312, the wagering game application 310 in combination with the serial number 312, etc. As described above, this authentication value 308 may be generated as part of the manufacturing of the wagering game machine, during initial set-up of the wagering game machine, etc. The authentication unit 304 may decrypt the digital signature (generating a message digest). The authentication unit 304 may hash the serial number 312, the wagering game application 310 in combination with the serial number 312, etc. (depending on what was used to derive the digital signature), which generates a second message digest. The authentication unit 304 may then compare the two message digests. If equal, the wagering game application 310 is considered authenticated.

The authentication unit 304 may also authenticate based on encryption/decryption. To illustrate, the authentication value 308 is an encrypted value. The encrypted value may be an encryption of the serial number 312, the wagering game application 310 in combination with the serial number 312, etc. The authentication unit 304 may decrypt the encrypted value. The authentication unit 304 may then verify that the decrypted value is equal to the value used for the encryption (e.g., the serial number 312). Such operations may be based on public key or private key cryptography. If the serial number 312 equals the decrypted value, the wagering game application 310 is considered authenticated.

Returning to the flow diagram 400, in response to a determination that the wagering game application is authenticated, the flow continues at block 408. Otherwise the flow continues at block 410 (described in more detail below).

At block 408, execution of the wagering game application on the wagering game machine is enabled. With reference to FIG. 3, the authentication unit 304 enables execution. The authentication unit 304 may enable by allowing access to the parts of machine-readable medium storing the wagering game application, allowing access to certain registers used for execution, enabling the loading of the application for execution, etc. The operations of the flow diagram 400 are complete.

At block 408, execution of the wagering game application on the wagering game machine is disabled. With reference to FIG. 3, the authentication unit 304 disables execution. The authentication unit 304 may disable by preventing access to the parts of machine-readable medium storing the wagering game application, preventing access to certain registers used for execution, disabling the loading of the application for execution, etc. The operations of the flow diagram 400 are complete.

The flow diagram 200 of FIG. 2 and the flow diagram 400 of FIG. 4 have been described separately. In some embodiments, the operations in the flow diagram 200 and the flow diagram 400 may be performed together, at least partially. For example, the authentication may be based on an external authentication device in combination with the serial number of the nonvolatile machine-readable medium.

Other types of protection may be used (alternatively or in addition to those described in FIGS. 1-4) to protect the data stored in the wagering game machine. In particular embodiments, an adhesive (such as an epoxy) may be used to attach the nonvolatile machine-readable medium (that stores that data to be protected may be epoxy) to the circuit board in the wagering game machine. Using an adhesive may deter the unauthorized copying of the data therein. In particular, the medium cannot be easily removed, thereby allowing easy access to data therein.

Example Operating Environment

Example Wagering Game Machine Architecture

Figure 5:
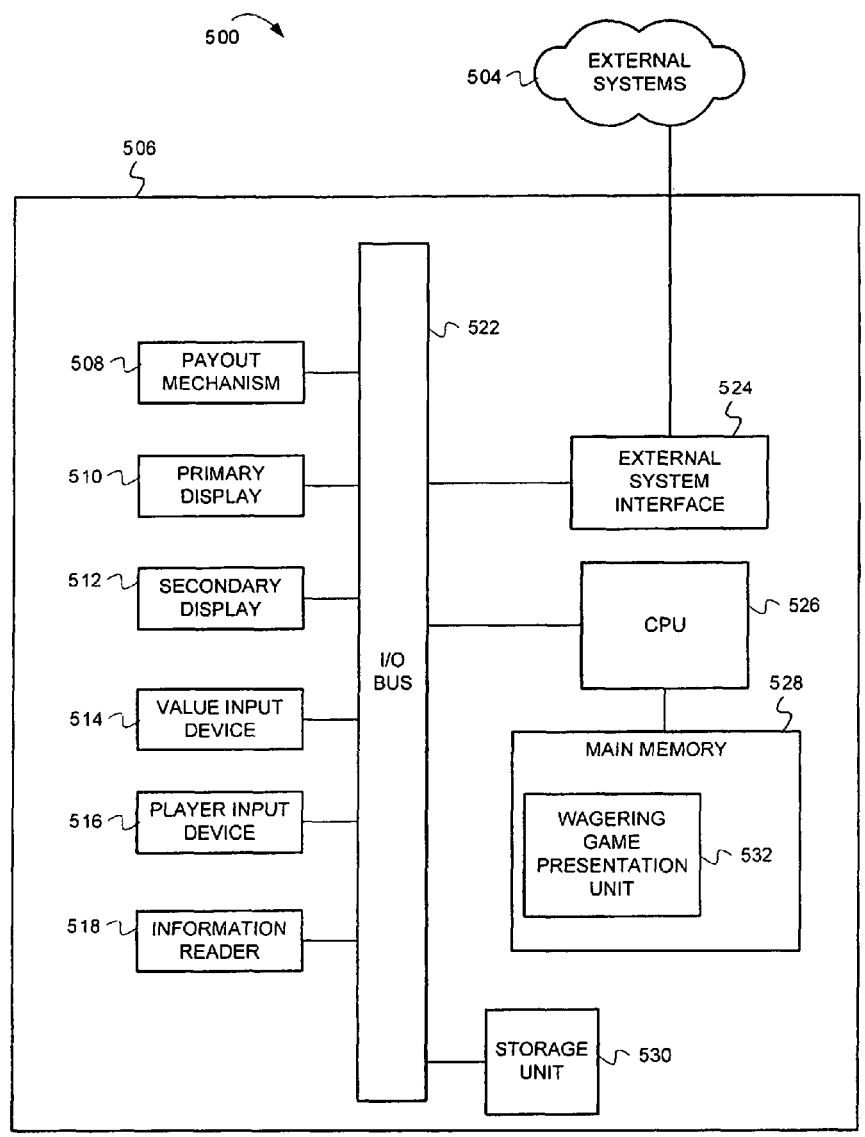
FIG. 5 is a block diagram illustrating a wagering game machine architecture, including a control system, according to example embodiments of the invention.

FIG. 5 is a block diagram illustrating a wagering game machine architecture, including a control system, according to example embodiments of the invention. As shown in FIG. 5, the wagering game machine 506 includes a central processing unit (CPU) 526 connected to main memory 528, which includes a wagering game presentation unit 532. In one embodiment, the wagering game presentation unit 532 can present wagering games, such as video poker, video black jack, video slots, video lottery, etc., in whole or part.

The CPU 526 is also connected to an input/output (I/O) bus 522, which facilitates communication between the wagering game machine's components. The I/O bus 522 is connected to a payout mechanism 508, primary display 510, secondary display 512, value input device 514, player input device 516, information reader 518, and storage unit 530. The player input device 516 can include the value input device 514 to the extent the player input device 516 is used to place wagers. The I/O bus 522 is also connected to an external system interface 524, which is connected to external systems 504 (e.g., wagering game networks).

In one embodiment, the wagering game machine 506 can include additional peripheral devices and/or more than one of each component shown in FIG. 5. For example, in one embodiment, the wagering game machine 506 can include multiple external system interfaces 524 and multiple CPUs 526. In one embodiment, any of the components can be integrated or subdivided. Additionally, in one embodiment, the components of the wagering game machine 506 can be interconnected according to any suitable interconnection architecture (e.g., directly connected, hypercube, etc.).

In one embodiment, any of the components of the wagering game machine 506 (e.g., the wagering game presentation unit 532) can include hardware, firmware, and/or software for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Figure 6:
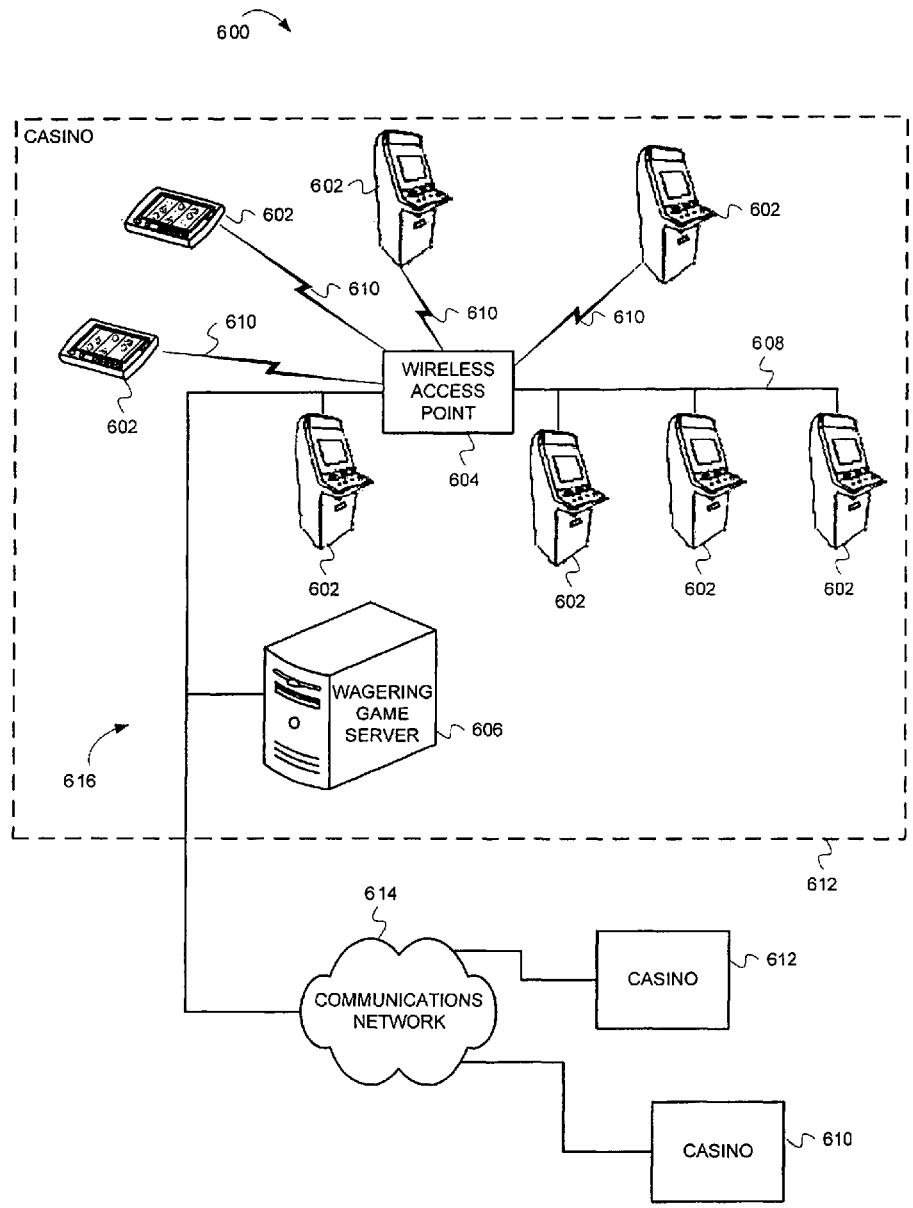
FIG. 6 is a block diagram illustrating a wagering game network, according to example embodiments of the invention.

While FIG. 5 describes example embodiments of a wagering game machine architecture, FIG. 6 shows how a plurality of wagering game machines can be connected in a wagering game network.

Example Wagering Game Network

As described above, in some embodiments, parts of the authentication may include network communication. For example, with reference to the flow diagram 200, the external authentication device may be a remote server. With reference to the flow diagram 400, the authentication value may be downloaded into the wagering game machine during the initial set-up. FIG. 6 is a block diagram illustrating a wagering game network, according to example embodiments of the invention. As shown in FIG. 6, the wagering game network 600 includes a plurality of casinos 612 connected to a communications network 614.

Each of the plurality of casinos 612 includes a local area network 616, which includes a wireless access point 604, wagering game machines 602, and a wagering game server 606 that can serve wagering games over the local area network 616. As such, the local area network 616 includes wireless communication links 610 and wired communication links 608. The wired and wireless communication links can employ any suitable connection technology, such as Bluetooth, 802.11, Ethernet, public switched telephone networks, SONET, etc. In one embodiment, the wagering game server 606 can serve wagering games and/or distribute content to devices located in other casinos 612 or at other locations on the communications network 614.

The wagering game machines 602 and wagering game server 606 can include hardware and machine-readable media including instructions for performing the operations described herein.

The wagering game machines 602 described herein can take any suitable form, such as floor standing models, hand-held mobile units, bartop models, workstation-type console models, etc. Further, the wagering game machines 602 can be primarily dedicated for use in conducting wagering games, or can include non-dedicated devices, such as mobile phones, personal digital assistants, personal computers, etc. In one embodiment, the wagering game network 600 can include other network devices, such as accounting servers, wide area progressive servers, player tracking servers, and/or other devices suitable for use in connection with embodiments of the invention.

Example Wireless Environment

In some embodiments, the wireless access point 604 and wagering game machines 602 can communicate orthogonal frequency division multiplexed (OFDM) communication signals over a multicarrier communication channel. The multicarrier communication channel can be within a predetermined frequency spectrum and can comprise a plurality of orthogonal subcarriers. In some embodiments, the multicarrier signals can be defined by closely spaced OFDM subcarriers. Each subcarrier can have a null at substantially a center frequency of the other subcarriers and/or each subcarrier can have an integer number of cycles within a symbol period. In some embodiments, the wireless access point 604 and wagering game machines 602 can communicate in accordance with a broadband multiple access technique, such as orthogonal frequency division multiple access (OFDMA). In some embodiments, the wireless access point 604 and wagering game machines 602 can communicate using spread-spectrum signals.

In some embodiments, the wireless access point 604 can be part of a communication station, such as wireless local area network (WLAN) communication station including a Wireless Fidelity (WiFi) communication station, or a WLAN access point (AP). In these embodiments, the wagering game machines 602 can be part of a mobile station, such as WLAN mobile station or a WiFi mobile station.

In some other embodiments, the wireless access point 604 can be part of a broadband wireless access (BWA) network communication station, such as a Worldwide Interoperability for Microwave Access (WiMax) communication station, as the wireless access point 604 can be part of almost any wireless communication device. In these embodiments, the wagering game machines 602 can be part of a BWA network communication station, such as a WiMax communication station.

In some embodiments, any of the wagering game machines 602 can be part of a portable wireless communication device, such as a personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), or other device that can receive and/or transmit information wirelessly.

In some embodiments, the frequency spectrums for the communication signals transmitted and received by the wireless access point 604 and the wagering game machines 602 can comprise either a 5 gigahertz (GHz) frequency spectrum or a 2.4 GHz frequency spectrum. In these embodiments, the 5 GHz frequency spectrum can include frequencies ranging from approximately 4.9 to 5.9 GHz, and the 2.4 GHz spectrum can include frequencies ranging from approximately 2.3 to 2.5 GHz, but other frequency spectrums are also equally suitable. In some BWA network embodiments, the frequency spectrum for the communication signals can comprise frequencies between 2 and 11 GHz.

In some embodiments, the wireless access point 604 and the wagering game machines 602 can communicate RF signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, but they can also be suitable to transmit and/or receive communications in accordance with other techniques and standards. In some BWA network embodiments, the wireless access point 604 and the wagering game machines 602 can communicate RF signals in accordance with the IEEE 802.16-2004 and the IEEE 802.16(e) standards for wireless metropolitan area networks (WMANs) including variations and evolutions thereof. However, they can also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," Can 2005 and related amendments/versions.

In some embodiments, the wireless access point 604 and the wagering game machines 602 can include one or more antennas (not shown). These antennas can comprise directional or omnidirectional antennas, including, for example, dipole antennas, monopole antennas, patch antennas, loop antennas, microstrip antennas or other types of antennas suitable for transmission of the RF signals. In some multiple-input, multiple-output (MIMO) embodiments, two or more antennas can be used. In some embodiments, instead of two or more antennas, a single antenna with multiple apertures can be used. In these multiple aperture embodiments, each aperture can be considered a separate antenna. In some multi-antenna embodiments, each antenna can be effectively separated to take advantage of spatial diversity and the different channel characteristics that can result between each of the antennas and another wireless communication device. In some multi-antenna embodiments, the antennas of a device can be separated by up to $\frac{1}{10}$ of a wavelength or more.

In some embodiments, handoffs between different wireless access points 104 and one of the wagering game machines 602 can be performed based on a signal-to-noise ratio (SNR), a signal-to-noise and interference ratio (SNIR), a bit-error rate (BER), or an energy per received bit.

In some embodiments, the wireless access point 604 and the wagering game machines 602 can communicate in accordance with standards such as the Pan-European mobile system standard referred to as the Global System for Mobile Communications (GSM). In some embodiments, the wireless access point 604 and the wagering game machines 602 can also communicate in accordance with packet radio services such as the General Packet Radio Service (GPRS) packet data communication service. In some embodiments, the wireless access point 604 and the wagering game machines 602 can communicate in accordance with the Universal Mobile Telephone System (UMTS) for the next generation of GSM, which can, for example, implement communication techniques in accordance with 2.5G and third generation (3G) wireless standards (See 3GPP Technical Specification, Version 3.2.0, March 2000). In some of these embodiments, the wireless access point 604 and the wagering game machines 602 can provide packet data services (PDS) utilizing packet data protocols (PDP). In other embodiments, the wireless access point 604 and the wagering game machines 602 can communicate in accordance with other standards or other air-interfaces including interfaces compatible with the enhanced data for GSM evolution (EDGE) standards (see 3GPP Technical Specification, Version 3.2.0, March 2000).

In other embodiments, the wireless access point 604 and the wagering game machines 602 can communicate in accordance with a short-range wireless standard, such as the Bluetooth™ short-range digital communication protocol. Bluetooth™ wireless technology is a de facto standard, as well as a specification for small-form factor, low-cost, short-range radio links between mobile PCs, mobile phones and other portable devices. (Bluetooth is a trademark owned by Bluetooth SIG, Inc.) In other embodiments, the wireless access point 604 and the wagering game machines 602 can communicate in accordance with an ultra-wideband (UWB) communication technique where a carrier frequency is not used. In other embodiments, the wireless access point 604 and the wagering game machines 602 can communicate in accordance with an analog communication technique. In other embodiments, the wireless access point 604 and the wagering game machines 602 can communicate in accordance with an optical communication technique, such as the Infrared Data Association (IrDA) standard. In some embodiments, the wireless access point 604 and the wagering game machines 602 can communicate in accordance with the Home-RF standard which can be in accordance with a Home-RF Working Group (HRFWG) standard.

Example Wagering Game Machine

Figure 7:
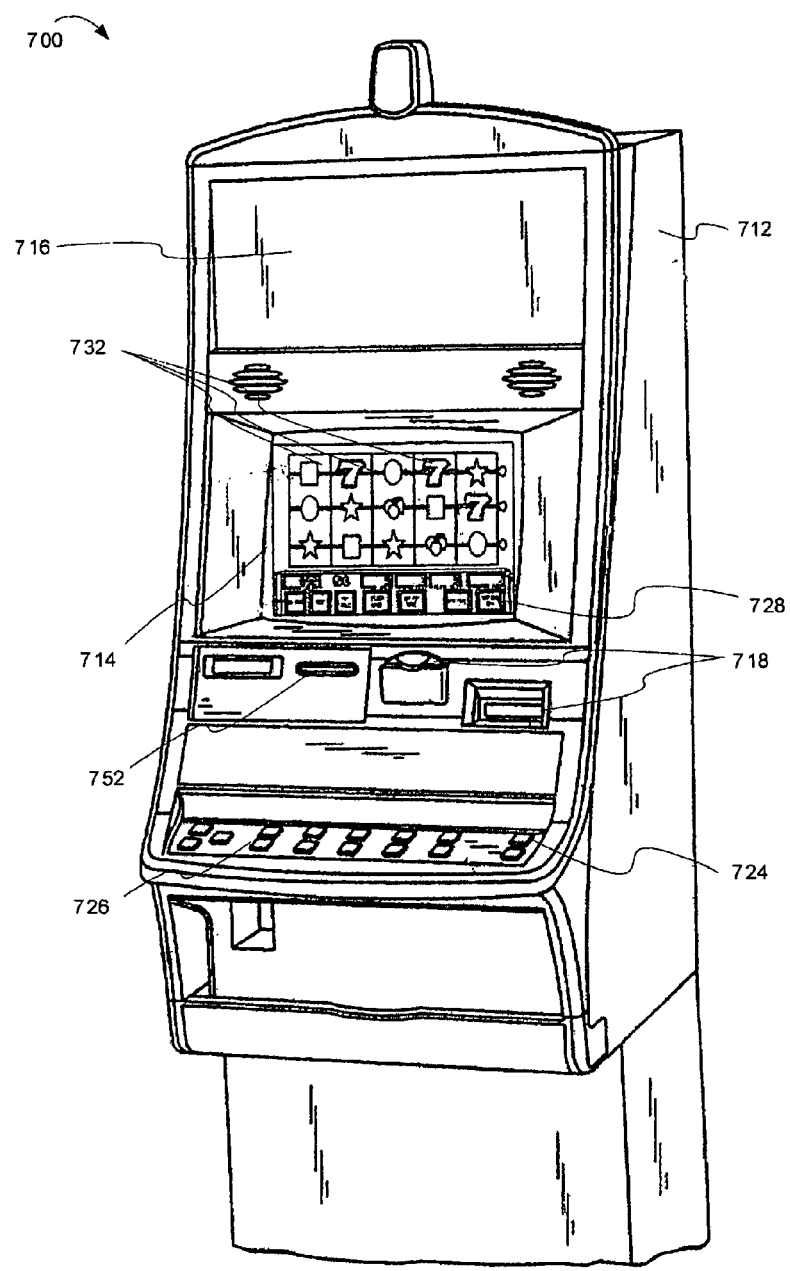
FIG. 7 is a perspective view of a wagering game machine, according to example embodiments of the invention.

FIG. 7 is a perspective view of a wagering game machine, according to example embodiments of the invention. Referring to FIG. 7, a wagering game machine 700 is used in gaming establishments, such as casinos. According to embodiments, the wagering game machine 700 can be any type of wagering game machine and can have varying structures and methods of operation. For example, the wagering game machine 700 can be an electromechanical wagering game machine configured to play mechanical slots, or it can be an electronic wagering game machine configured to play video casino games, such as blackjack, slots, keno, poker, blackjack, roulette, etc.

The wagering game machine 700 comprises a housing 712 and includes input devices, including value input devices 718 and a player input device 724. For output, the wagering game machine 700 includes a primary display 714 for displaying information about a basic wagering game. The primary display 714 can also display information about a bonus wagering game and a progressive wagering game. The wagering game machine 700 also includes a secondary display 716 for displaying wagering game events, wagering game outcomes, and/or signage information. While some components of the wagering game machine 700 are described herein, numerous other elements can exist and can be used in any number or combination to create varying forms of the wagering game machine 700.

The value input devices 718 can take any suitable form and can be located on the front of the housing 712. The value input devices 718 can receive currency and/or credits inserted by a player. The value input devices 718 can include coin acceptors for receiving coin currency and bill acceptors for receiving paper currency. Furthermore, the value input devices 718 can include ticket readers or barcode scanners for reading information stored on vouchers, cards, or other tangible portable storage devices. The vouchers or cards can authorize access to central accounts, which can transfer money to the wagering game machine 700.

The player input device 724 comprises a plurality of push buttons on a button panel 726 for operating the wagering game machine 700. In addition, or alternatively, the player input device 724 can comprise a touch screen 728 mounted over the primary display 714 and/or secondary display 716.

The various components of the wagering game machine 700 can be connected directly to, or contained within, the housing 712. Alternatively, some of the wagering game machine's components can be located outside of the housing 712, while being communicatively coupled with the wagering game machine 700 using any suitable wired or wireless communication technology.

The operation of the basic wagering game can be displayed to the player on the primary display 714. The primary display 714 can also display a bonus game associated with the basic wagering game. The primary display 714 can include a cathode ray tube (CRT), a high resolution liquid crystal display (LCD), a plasma display, light emitting diodes (LEDs), or any other type of display suitable for use in the wagering game machine 700. Alternatively, the primary display 714 can include a number of mechanical reels to display the outcome. In FIG. 7, the wagering game machine 700 is an "upright" version in which the primary display 714 is oriented vertically relative to the player. Alternatively, the wagering game machine can be a "slant-top" version in which the primary display 714 is slanted at about a thirty-degree angle toward the player of the wagering game machine 700. In yet another embodiment, the wagering game machine 700 can exhibit any suitable form factor, such as a free standing model, bartop model, mobile handheld model, or workstation console model.

A player begins playing a basic wagering game by making a wager via the value input device 718. The player can initiate play by using the player input device's buttons or touch screen 728. The basic game can include arranging a plurality of symbols along a payline 732, which indicates one or more outcomes of the basic game. Such outcomes can be randomly selected in response to player input. At least one of the outcomes, which can include any variation or combination of symbols, can trigger a bonus game.

In some embodiments, the wagering game machine 700 can also include an information reader 752, which can include a card reader, ticket reader, bar code scanner, RFID transceiver, or computer readable storage medium interface. In some embodiments, the information reader 752 can be used to award complimentary services, restore game assets, track player habits, etc.

Example Wagering Game Machine

Figure 8:
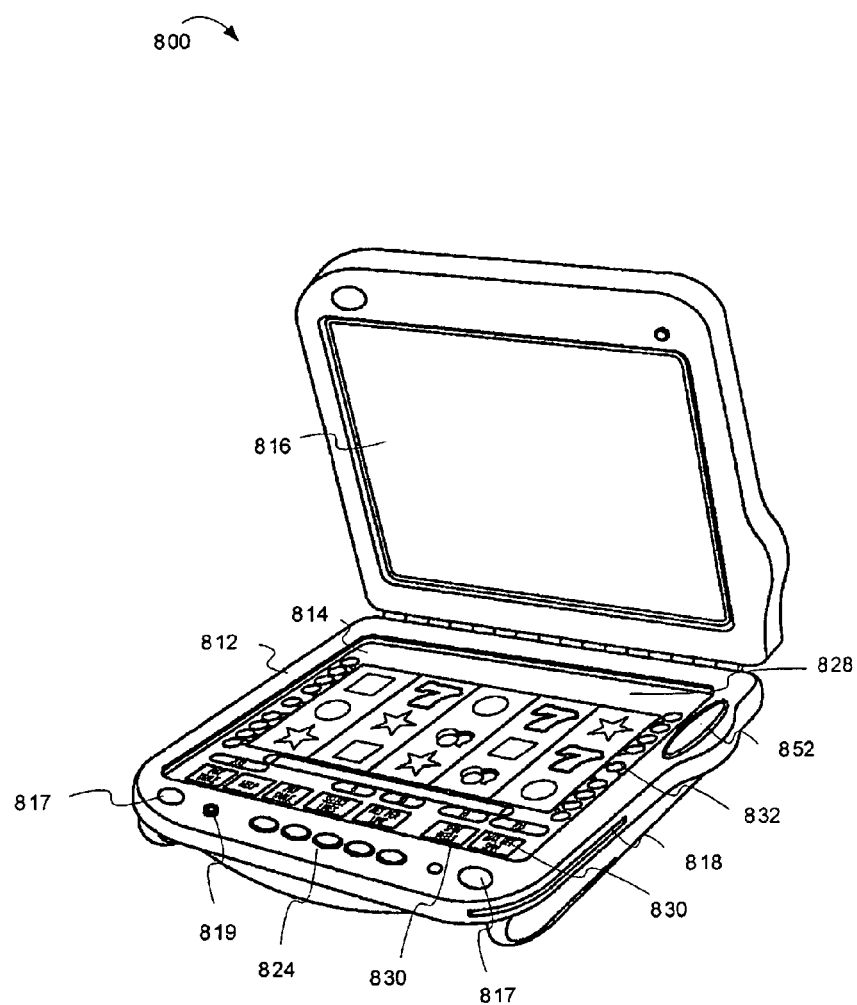
FIG. 8 shows an example embodiment of a wagering game machine.

FIG. 8 shows an example embodiment of a wagering game machine. Like free standing wagering game machines, in a handheld or mobile form, the wagering game machine 810 can include any suitable electronic device configured to play a video casino games such as blackjack, slots, keno, poker, blackjack, and roulette. The wagering game machine 810 comprises a housing 812 and includes input devices, including a value input device 818 and a player input device 824. For output, the wagering game machine 810 includes a primary display 814, a secondary display 816, one or more speakers 817, one or more player-accessible ports 819 (e.g., an audio output jack for headphones, a video headset jack, etc.), and other conventional I/O devices and ports, which may or may not be player-accessible. In the embodiment depicted in FIG. 8, the wagering game machine 810 comprises a secondary display 816 that is rotatable relative to the primary display 814. The optional secondary display 816 can be fixed, movable, and/or detachable/attachable relative to the primary display 814. Either the primary display 814 and/or secondary display 816 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 818 can comprise, for example, a slot located on the front, side, or top of the casing 812 configured to receive credit from a stored-value card (e.g., casino card, smart card, debit card, credit card, etc.) inserted by a player. The player-accessible value input device 818 can also comprise a sensor (e.g., an RF sensor) configured to sense a signal (e.g., an RF signal) output by a transmitter (e.g., an RF transmitter) carried by a player. The player-accessible value input device 818 can also or alternatively include a ticket reader, or barcode scanner, for reading information stored on a credit ticket, a card, or other tangible portable credit or funds storage device. The credit ticket or card can also authorize access to a central account, which can transfer money to the wagering game machine 810.

Still other player-accessible value input devices 818 can require the use of touch keys 830 on the touch-screen display (e.g., primary display 814 and/or secondary display 816) or player input devices 824. Upon entry of player identification information and, preferably, secondary authorization information (e.g., a password, PIN number, stored value card number, predefined key sequences, etc.), the player can be permitted to access a player's account. As one potential optional security feature, the wagering game machine 810 can be configured to permit a player to only access an account the player has specifically set up for the wagering game machine 810. Other conventional security features can also be utilized to, for example, prevent unauthorized access to a player's account, to minimize an impact of any unauthorized access to a player's account, or to prevent unauthorized access to any personal information or funds temporarily stored on the wagering game machine 810.

The player-accessible value input device 818 can itself comprise or utilize a biometric player information reader which permits the player to access available funds on a player's account, either alone or in combination with another of the aforementioned player-accessible value input devices 818. In an embodiment wherein the player-accessible value input device 818 comprises a biometric player information reader, transactions such as an input of value to the wagering game machine 810, a transfer of value from one player account or source to an account associated with the wagering game machine 810, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 818 comprising a biometric player information reader can require a confirmatory entry from another biometric player information reader 852, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 818 can be provided remotely from the wagering game machine 810.

The player input device 824 comprises a plurality of push buttons on a button panel for operating the wagering game machine 810. In addition, or alternatively, the player input device 824 can comprise a touch screen mounted to a primary display 814 and/or secondary display 816. In one aspect, the touch screen is matched to a display screen having one or more selectable touch keys 830 selectable by a user's touching of the associated area of the screen using a finger or a tool, such as a stylus pointer. A player enables a desired function either by touching the touch screen at an appropriate touch key 830 or by pressing an appropriate push button on the button panel. The touch keys 830 can be used to implement the same functions as push buttons. Alternatively, the push buttons 826 can provide inputs for one aspect of the operating the game, while the touch keys 830 can allow for input needed for another aspect of the game. The various components of the wagering game machine 810 can be connected directly to, or contained within, the casing 812, as seen in FIG. 8, or can be located outside the casing 812 and connected to the casing 812 via a variety of wired (tethered) or wireless connection methods. Thus, the wagering game machine 810 can comprise a single unit or a plurality of interconnected (e.g., wireless connections) parts which can be arranged to suit a player's preferences.

The operation of the basic wagering game on the wagering game machine 810 is displayed to the player on the primary display 814. The primary display 814 can also display the bonus game associated with the basic wagering game. The primary display 814 preferably takes the form of a high resolution LCD, a plasma display, an LED, or any other type of display suitable for use in the wagering game machine 810. The size of the primary display 814 can vary from, for example, about a 2-3" display to a 15" or 17" display. In at least some embodiments, the primary display 814 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 814 and/or secondary display 816 can have a 16:9 aspect ratio or other aspect ratio (e.g., 4:3). The primary display 814 and/or secondary display 816 can also each have different resolutions, different color schemes, and different aspect ratios.

As with the free standing embodiments a wagering gaming machine, a player begins play of the basic wagering game on the wagering game machine 810 by making a wager (e.g., via the value input device 818 or an assignment of credits stored on the handheld gaming machine via the touch screen keys 830, player input device 824, or buttons 826) on the wagering game machine 810. In some embodiments, the basic game can comprise a plurality of symbols arranged in an array, and includes at least one payline 832 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 818 of the wagering game machine 810 can double as a player information reader 852 that allows for identification of a player by reading a card with information indicating the player's identity (e.g., reading a player's credit card, player ID card, smart card, etc.). The player information reader 852 can alternatively or also comprise a bar code scanner, RFID transceiver or computer readable storage medium interface. In one embodiment, the player information reader 852 comprises a biometric sensing device.

GENERAL

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

Each of the embodiments described herein are contemplated as falling within the inventive subject matter, which is set forth in the following claims.

What is claimed is:

1. A computer-implemented method performed in a wagering game machine, the computer-implemented method comprising:
retrieving, with an electronic wagering game machine authentication unit, a media identification value associated with and stored in an electronic non-transitory nonvolatile machine-readable medium coupled to the wagering game machine;
retrieving, with the electronic wagering game machine authentication unit, an authentication value stored in the nonvolatile machine-readable medium, wherein the authentication value is an encrypted value that is an encryption of the media identification value in combination with an executable wagering game application stored in the nonvolatile machine-readable medium, wherein the media identification value is unique among each of a plurality of nonvolatile machine-readable media, including the nonvolatile machine-readable medium, on which an instance of the executable wagering game application is stored, such that no two of the plurality of nonvolatile machine-readable media have the same media identification value associated therewith;
determining, with at least one processor, that the authentication value authenticates the media identification value in combination with the executable wagering game application stored in the nonvolatile machine-readable medium by decrypting the authentication value to generate at least a decrypted value and comparing the media identification value stored in the nonvolatile machine-readable medium with the decrypted value;
enabling execution by the at least one processor of the executable wagering game application in response to authenticating the executable wagering game application; and
disabling access, by the at least one processor, to one or more portions of the nonvolatile machine-readable medium storing the executable wagering game application, in response to determining that the authentication value does not authenticate the executable wagering game application.

2. The method of claim 1, wherein retrieving the media identification value associated with and stored in the nonvolatile machine-readable medium comprises retrieving a serial number of the nonvolatile machine-readable medium.

3. The method of claim 1, wherein the operations are performed as part of a boot-up operation of the wagering game machine.

4. At least one non-transitory machine-readable storage medium comprising instructions that when executed by one or more processors operably coupled to the at least one non-transitory machine-readable storage medium, cause the one or more processors to perform operations comprising:
retrieving a media identification value associated with and stored in a non-transitory nonvolatile machine-readable medium coupled to a wagering game machine;
retrieving an authentication value stored in the nonvolatile machine-readable medium, wherein the authentication value is an encrypted value that is an encryption of the media identification value in combination with a wagering game application stored in the nonvolatile machine-readable medium, wherein the media identification value is unique among each of a plurality of nonvolatile machine-readable media, including the nonvolatile machine-readable medium, on which an instance of the wagering game application is stored, such that no two of the plurality of nonvolatile machine-readable media have the same media identification value associated therewith;
determining that the authentication value authenticates the media identification value in combination with the wagering game application stored in the nonvolatile machine-readable medium by decrypting the encrypted authentication value to generate a decrypted value and comparing the media identification value associated with the nonvolatile machine-readable medium with the decrypted value;
enabling execution of the wagering game application in response to the decrypted value matching the media identification value; and
disabling access to one or more portions of the nonvolatile machine-readable medium storing the wagering game application, in response to determining that the decrypted value does not match the media identification value.

5. The at least one non-transitory machine-readable storage medium of claim 4, wherein the operation of retrieving the media identification value associated with and stored in the nonvolatile machine-readable medium comprises retrieving a serial number of the nonvolatile machine-readable medium.

6. The at least one non-transitory machine-readable storage medium of claim 4, wherein the operations are performed as part of a boot-up operation of the wagering game machine.

7. A wagering game machine comprising:

one or more input/output (I/O) ports configured to communicate with an attached non-transitory non-volatile machine readable medium;

one or more processors; and at least one non-transitory machine-readable storage medium, operably coupled to the one or more processors, comprising instructions that when executed by the one or more processors, cause the one or more processors to perform operations comprising:

retrieving a media identification value associated with and stored in the nonvolatile machine-readable medium; and retrieving an authentication value stored in the nonvolatile machine-readable medium, wherein the authentication value is an encrypted value that is an encryption of the media identification value in combination with a wagering game application stored in the nonvolatile machine-readable medium, wherein the media identification value is unique among each of a plurality of nonvolatile machine-readable media, including the nonvolatile machine-readable medium, on which an instance of the wagering game application is stored, such that no two of the plurality of nonvolatile machine-readable media have the same media identification value associated therewith;

determining whether the authentication value authenticates the media identification value in combination with the wagering game application stored in the nonvolatile machine-readable medium by decrypting the encrypted authentication value to generate a decrypted value and comparing the media identification value associated with the nonvolatile machine-readable medium with the decrypted value;

enabling execution of the wagering game application in response to a determination that the authentication value authenticates the wagering game application; and disabling access to one or more portions of the nonvolatile machine-readable medium storing the wagering game application, in response to determining that the authentication value does not authenticate the wagering game application.

8. The wagering game machine of claim 7, wherein retrieving the media identification value associated with and stored in the nonvolatile machine-readable medium comprises retrieving a serial number of the nonvolatile machine-readable medium.

9. The wagering game machine of claim 7, wherein the operations of retrieving the authentication value, retrieving the media identification value associated with the nonvolatile machine readable medium, determining whether the authentication value authenticates the media authentication value in combination with the wagering game application and enabling execution of the wagering game application in response to a determination that the authentication value authenticates the wagering game application are performed as part of a boot-up operation of the wagering game machine.

* * * * *